Patented Sept. 1, 1925.

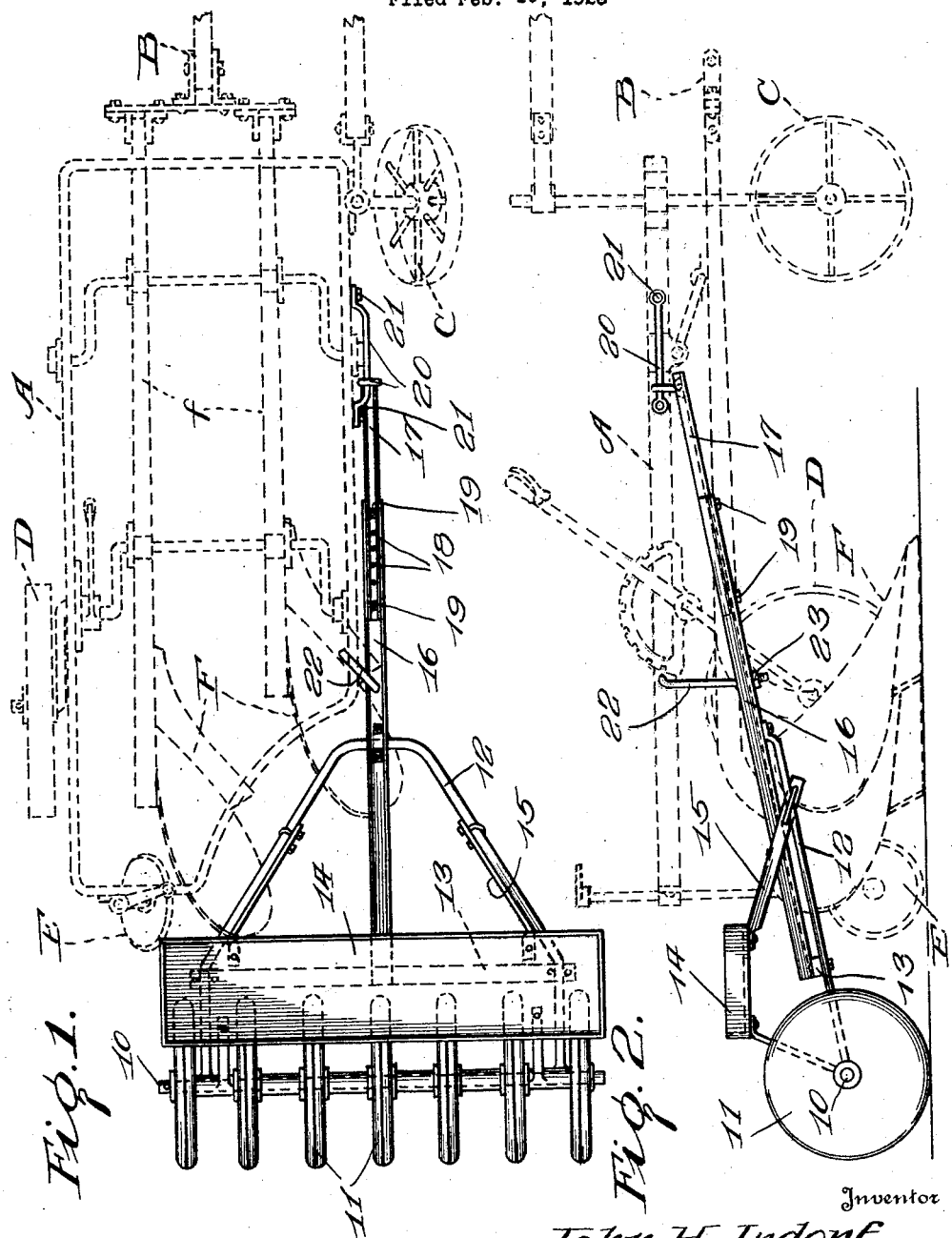

1,552,306

UNITED STATES PATENT OFFICE.

JOHN H. INDORF, OF ST. FRANCIS, KANSAS.

CLOD-CRUSHER ATTACHMENT FOR GANG PLOWS.

Application filed February 10, 1923. Serial No. 618,395.

*To all whom it may concern:*

Be it known that I, JOHN H. INDORF, a citizen of the United States, residing at St. Francis, in the county of Cheyenne and State of Kansas, have invented certain new and useful Improvements in Clod-Crusher Attachments for Gang Plows, of which the the following is a specification, reference being had to the accompanying drawings.

This invention relates to agricultural implements, and particularly to clod crushers designed to be drawn behind a gang plow for the purpose of breaking up and crushing the clods left by the plow so that the earth may be put in proper condition while it is being plowed without the necessity of again going over the plowed ground for the purpose of breaking up the clods with a separate clod crusher.

The general object of my invention is to provide a simple clod crusher of this character which is so designed that it may be readily attached to any of the ordinary light gang draft plows.

One of the special objects is to provide a device of this character in which the tongue whereby the clod crusher connected to the frame of the gang plow is adjustable so that the clod crusher may be made to fit any frame carrying one, two, three or even four plows.

Other objects have to do with the details of construction and arrangement of parts as will be hereinafter more fully described.

My invention is illustrated in the accompanying drawings, wherein:—

Figure 1 is a plan view of a gang plow with my clod breaker and packer attachment connected thereto, the gang plow being shown in dotted lines;

Figure 2 is a side elevation of the construction shown in Figure 1.

Referring to these drawings, A designates generally an ordinary light draft gang plow having the usual draft tongue B, the forward traction wheel C, the middle traction wheel D, and the disk E. The plows F are mounted on the usual beams *f* connected to the usual means for raising or lowering the plows. All of the parts heretofore recited are of any ordinary or conventional type and I have only illustrated enough of the gang plow to show where my invention is applicable thereto.

My improved attachment comprises a shaft 10 upon which are mounted the spaced disks 11, as many of these disks being used as desired. Connected to bearings for the shaft 10 are the convergent draft bars 12, these bars being connected by a transverse brace 13. Supported upon the bearings in any suitable manner above the disks 11 is a weight supporting pan 14 braced from the draft bars 12 by means of the braces 15, these braces engaging the draft bars 12 forward of the cross brace 13. Connected to the convergent ends of the draft bars 12 and extending rearward and connected to the brace 13 is the attachment tongue which consists of two sections 16 and 17. The section 16 is preferably of light channel or angle iron, though any suitable material may be used, and at its forward end is provided with a plurality of openings 18. The section 17 is adapted to fit the channel iron and be adjustable along the tongue section 16 and is provided at its rear end with a plurality of openings through which bolts 19 may pass. Thus this section 17 may be adjusted with relation to the section 16 so that the tongue as a whole is longitudinally adjustable. The forward end of the tongue section 17 is so formed as to be engaged by a clip or clevis 20 which is formed to engage one of the side beams B of the plow frame and be detachably bolted thereto by the bolts 21. Any suitable clip may be used for this purpose and may be bolted to any suitable point on the frame beam G.

The rear section 16 of the attachment tongue is preferably connected to the plow frame by means of an upwardly and laterally extending brace 22 which is bolted to the section 16 at its lower end and to a bar of the frame at 23. The brace 22 is for the purpose of holding the clod crusher away from the plow so it will not interfere with the soil turned over by the plow and so that the clod crusher can neither swing outward nor inward.

This attachment is readily applied to the ordinary draft gang plow and when applied acts to pack the ground and break up the clods behind the plow while the ground is being plowed and without requiring an extra rim and operator to follow the main plow. The device is very readily adjustable, can be easily put in place or taken off, and it has been found in practice to be of particular value.

While I have illustrated certain details of construction, I do not wish to be limited thereto, as it is obvious that the details may be varied in many ways without departing from the spirit of the invention as embodied in the appended claim.

I claim:—

A clod breaking and packing attachment for gang plows comprising a shaft, a series of packing disks rotatably mounted upon the shaft, bearings on the shaft, forwardly converging draft bars connected to said bearings, a pan disposed above the disks, members connected to the bearings and to the pan, braces connected to the draft bars and to the pan whereby the pan may be supported, a transverse brace extending across the draft bars, a rear tongue section operatively connected at its rear end to said brace and to the convergent ends of the draft bars, a forward tongue section, longitudinally adjustable upon the rear tongue section and carrying a clevis at its forward end whereby it may be detachably connected to the frame of a plow, and an angular brace attached to the rear tongue section and extending upwardly and laterally therefrom and adapted to be connected to the frame of the plow.

In testimony whereof I hereunto affix my signature.

JOHN H. INDORF.